US012659586B2

(12) United States Patent (10) Patent No.: US 12,659,586 B2
Savolainen et al. (45) Date of Patent: Jun. 16, 2026

(54) SYSTEM AND METHOD FOR STABILIZING IMAGING SENSOR DATA

(71) Applicant: Unikie Oy, Tampere (FI)

(72) Inventors: Tuomas Savolainen, Espoo (FI); Mikko Martikka, Vantaa (FI)

(73) Assignee: Unikie Oy, Tampere (FI)

( * ) Notice: Subject to any disclaimer, the term of this patent is extended or adjusted under 35 U.S.C. 154(b) by 385 days.

(21) Appl. No.: 18/194,698

(22) Filed: Apr. 3, 2023

(65) Prior Publication Data

US 2024/0334054 A1 Oct. 3, 2024

(51) Int. Cl.
*H04N 23/68* (2023.01)
*H04N 23/61* (2023.01)

(52) U.S. Cl.
CPC ......... *H04N 23/6811* (2023.01); *H04N 23/61* (2023.01); *H04N 23/6812* (2023.01)

(58) Field of Classification Search
None
See application file for complete search history.

(56) References Cited

U.S. PATENT DOCUMENTS

2020/0234491 A1* 7/2020 Pöyhtäri ................ G06T 17/00
2022/0285009 A1* 9/2022 Sha ........................... G06T 3/14

OTHER PUBLICATIONS

Brenner et al. "Coarse orientation of terrestrial laser scans in urban environments", ISPRS Journal of Photogrammetry and remote sensing, Elsevier, vol. 63, No. 1, Jan. 31, 2008, ISSN: 0924-2716, DOI: 10.1016/J.ISPRSJPRS.2007.05.002, 15 pages.

European Patent Office, Extended European Search Report, Application No. 24164730.4, mailed Sep. 17, 2024. 14 pages.
Liu et al. "Video Stabilization with a Depth Camera" Computer Vision and Pattern Recognition (CVPR), 2012 IEEE Conference, Jun. 16, 2012, DOI: 10.1109/CVPR.2012.6247662, ISBN: 978-1-4673-1226-4, 7 pages.
Meng et al. "Real-Time Digital Video Stabilization of Bioinspired Robotic Fish Using Estimation-and-Prediction Framework" IEEE/ASME Transaction on Mechtronics [Online}, Jun. 3, 2021, ISSN: 1083-4435, DOI: 10.1109/TMECH.2022.3155696, 12 pages.
Shan et al., "LVI-SAM: Tightly-coupled Lidar-Visual-Inertial Odometry via Smoothing and Mapping" 2021 IEEE International Confernce on Robotics and Automations (ICRA), IEEE, May 30, 2021, DOI: 10.1109/ICRA48506.2021.9561996, 7 pages.

* cited by examiner

*Primary Examiner* — Isam A Alsomiri
*Assistant Examiner* — Sanjida Naser
(74) *Attorney, Agent, or Firm* — Ziegler IP Law Group, LLC

(57) ABSTRACT

A system for stabilizing imaging sensor data includes an imaging sensor configured to capture first image in first pose of the imaging sensor in respect to a real-world environment, and second image in a second pose of the imaging sensor in respect to the real-world environment; at least one processor communicably coupled to the imaging sensor, wherein the at least one processor is configured to determine a first transformation between the first pose and the second pose; and correct the second image, based on the first image and the first transformation, to be perspective-consistent with the first pose.

13 Claims, 5 Drawing Sheets

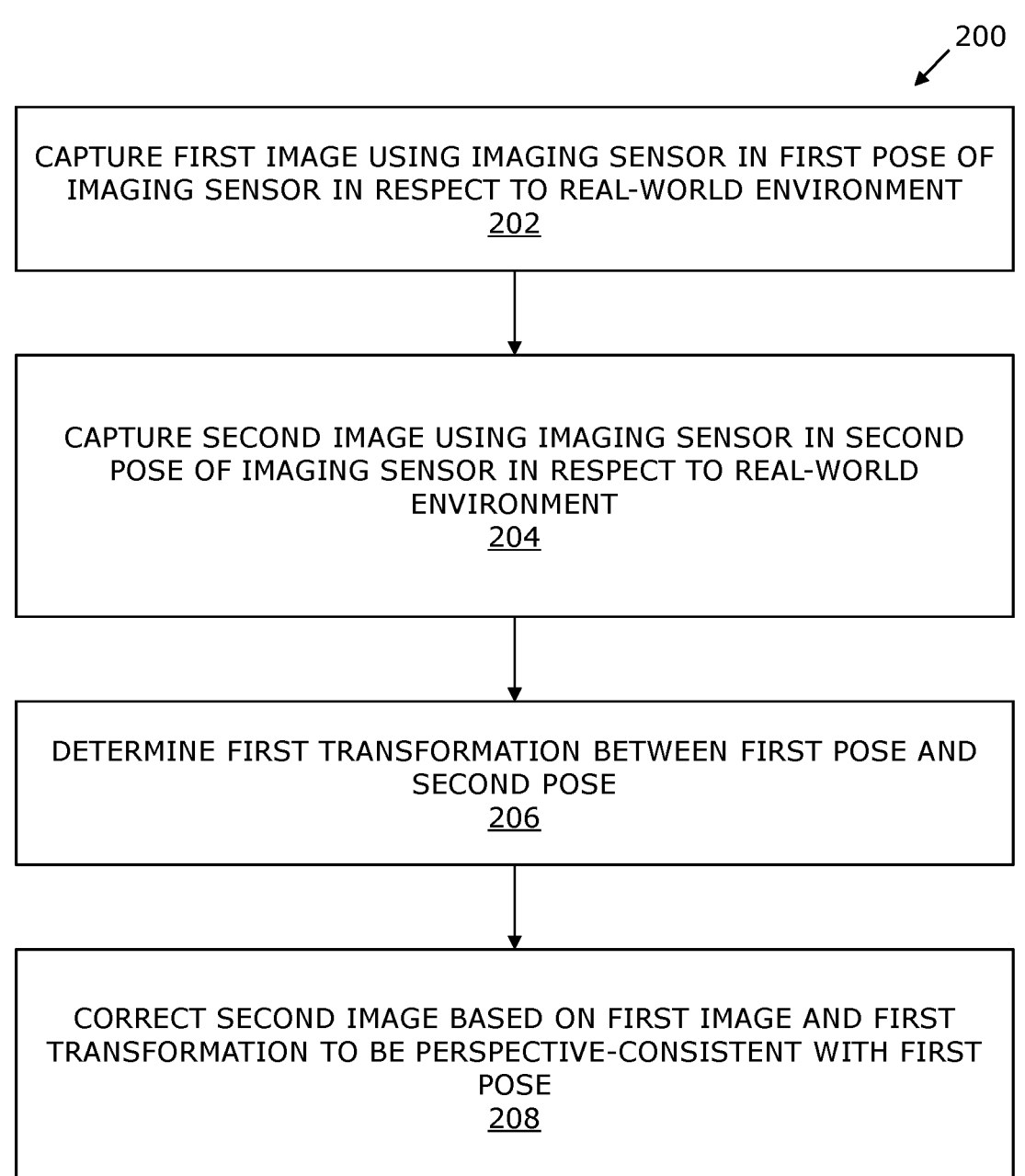

200

CAPTURE FIRST IMAGE USING IMAGING SENSOR IN FIRST POSE OF IMAGING SENSOR IN RESPECT TO REAL-WORLD ENVIRONMENT
202

CAPTURE SECOND IMAGE USING IMAGING SENSOR IN SECOND POSE OF IMAGING SENSOR IN RESPECT TO REAL-WORLD ENVIRONMENT
204

DETERMINE FIRST TRANSFORMATION BETWEEN FIRST POSE AND SECOND POSE
206

CORRECT SECOND IMAGE BASED ON FIRST IMAGE AND FIRST TRANSFORMATION TO BE PERSPECTIVE-CONSISTENT WITH FIRST POSE
208

FIG. 2

SYSTEM AND METHOD FOR STABILIZING IMAGING SENSOR DATA

TECHNICAL FIELD

The present disclosure relates to systems for stabilizing imaging sensor data. The present disclosure also relates to methods for stabilizing imaging sensor data. The present disclosure also relates to computer program products for stabilizing imaging sensor data.

BACKGROUND

An imaging device is used to produce digital images. The imaging device could be a digital camera, an imaging apparatus used for medical diagnosis, a night vision imaging device like Radio Detection and Ranging (Radar), thermal imaging device, Sound Navigation and Ranging (Sonar), Light Detection and Ranging (Lidar) etc. In case of the night vision imaging device, it may be mounted on a certain height such as a lamppost or a similar structure in places like ports or similar to appropriately capture three-dimensional (3D) space. For example, Lidar can be used in several applications within ports. As an example, the Lidar can be mounted to a ship-to-shore (STS) crane, automatic stacking crane (ASC), or similar. However, owing to such placement of the imaging device, there is a significant chance of unwanted disturbance in pose of the imaging device, leading to compromising accuracy and usability of the imaging device. Moreover, the disturbance in the pose of the imaging device may get worse in harsh weather conditions, such as windy conditions. In aforesaid conditions, the imaging device deviate from a pre-calibrated state. Further, this is more severe in cases where a pair of the imaging devices are used. In such cases, the imaging devices of the pair need to align to their respective pre-calibrated states and with respect to each other as well. Therefore, in such cases, accuracy of imaging devices is further compromised.

In an attempt to mitigate the aforesaid problems, several solutions have been used. However, conventional solutions have several problems associated with them. For example, in the case of cameras, images can be stabilized using motion sensors. Motion sensors can be used to compensate for blur in the images. However, motion sensors fail to accurately transform the images.

Therefore, in light of the foregoing discussion, there exists a need to overcome the aforementioned drawbacks associated with stabilizing imaging devices.

SUMMARY

The present disclosure seeks to provide a system for stabilizing imaging sensor data. The present disclosure also seeks to provide a method for stabilizing imaging sensor data. The present disclosure also seeks to provide a computer program product for stabilizing imaging sensor data. An aim of the present disclosure is to provide a solution that overcomes at least partially the problems encountered in prior art.

In a first aspect, an embodiment of the present disclosure provides a system for stabilizing imaging sensor data, the system comprising:

an imaging sensor configured to capture a first image in a first pose of the imaging sensor in respect to a real-world environment, and a second image in a second pose of the imaging sensor in respect to the real-world environment;

at least one processor communicably coupled to the imaging sensor, wherein the at least one processor is configured to:

determine a first transformation between the first pose and the second pose; and correct the second image, based on the first image and the first transformation, to be perspective-consistent with the first pose.

In a second aspect, an embodiment of the present disclosure provides a method for stabilizing imaging sensor data, the method comprising:

capturing a first image using an imaging sensor arranged in a first pose in respect to a real-world environment;

capturing a second image using the imaging sensor arranged in a second pose in respect to the real-world environment;

determining a first transformation between the first pose and the second pose; and correcting the second image, based on the first image and the first transformation, to be perspective-consistent with the first pose.

In a third aspect, an embodiment of the present disclosure provides a computer program product for stabilizing imaging sensor data, the computer program product comprising a non-transitory machine-readable data storage medium having stored thereon program instructions that, when accessed by at least one processor, cause the at least one processor to implement the method of the second aspect.

Embodiments of the present disclosure substantially eliminate or at least partially address the aforementioned problems in the prior art and enable digital stabilization of image sensor data by way of image correction based on a pose transformation of the image sensor.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2 is a flow chart of steps of method for stabilizing imaging sensor data, in accordance with an embodiment of the present disclosure;

3

Figure 4A:
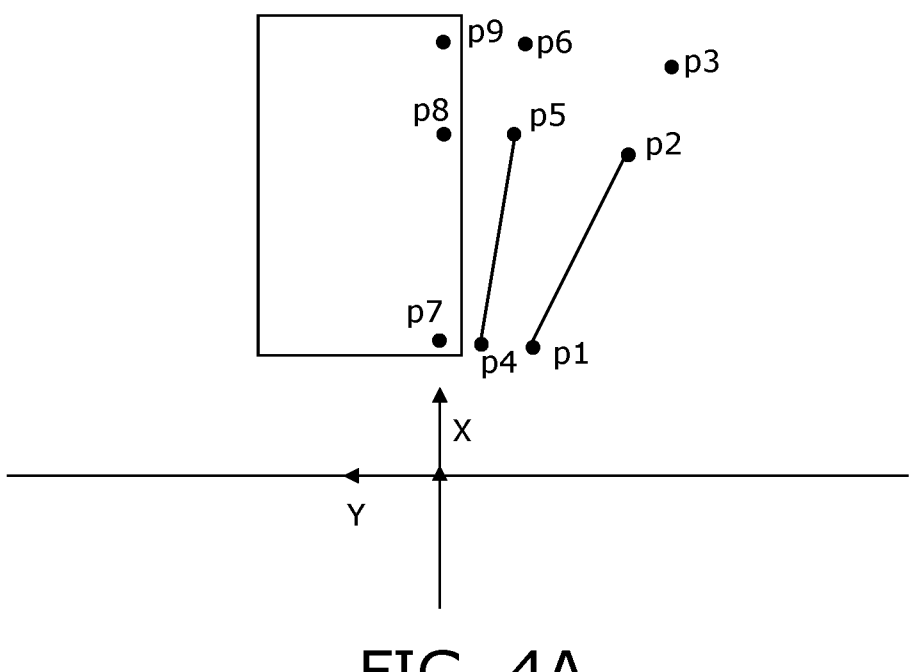
Figure 4B:
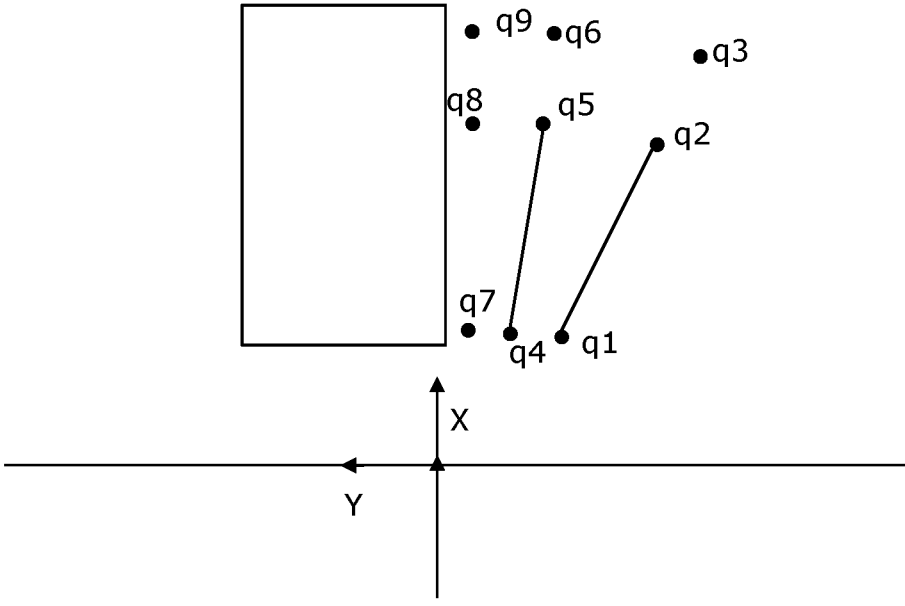

4 world environment at different instances, in accordance with an embodiment of the present disclosure; and FIGS. 4A and 4B are exemplary illustrations of a first set of data points in a first point cloud and a second set of data points in a second point cloud, respectively, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system for stabilizing imaging sensor data, the system comprising:

an imaging sensor configured to capture a first image in a first pose of the imaging sensor in respect to a real-world environment, and a second image in a second pose of the imaging sensor in respect to the real-world environment;

at least one processor communicably coupled to the imaging sensor, wherein the at least one processor is configured to:

determine a first transformation between the first pose and the second pose; and correct the second image, based on the first image and the first transformation, to be perspective-consistent with the first pose.

In a second aspect, an embodiment of the present disclosure provides a method for stabilizing imaging sensor data, the method comprising:

capturing a first image using an imaging sensor arranged in a first pose in respect to a real-world environment;

capturing a second image using the imaging sensor arranged in a second pose in respect to the real-world environment;

determining a first transformation between the first pose and the second pose; and correcting the second image, based on the first image and the first transformation, to be perspective-consistent with the first pose.

In a third aspect, an embodiment of the present disclosure provides a computer program product for stabilizing imaging sensor data, the computer program product comprising a non-transitory machine-readable data storage medium having stored thereon program instructions that, when accessed by at least one processor, cause the at least one processor to implement the method of the second aspect.

The present disclosure provides the aforementioned system and method for stabilizing the imaging sensor data. The system determines the first transformation between the first pose and the second pose of the imaging sensor. The first transformation between the first pose and the second pose is used to stabilize signals of the imaging sensor at the second pose with respect to the first pose. Beneficially, determination of the first transformation helps to stabilize the signal of the imaging sensor in case the imaging sensor wobbles due to external forces. Correction of the second image obtained after the first transformation of the imaging sensor based on the first image of the imaging sensor results in accurate transformation of the second image, leading to accurate correction. More beneficially, the system enables correction of a given image to a reference image (i.e., the first image) independent of time of capturing the given image. The method of stabilizing the imaging sensor data is simple, fast, and easy to perform.

The term "imaging sensor" refers to an electronic device that senses optical signals (i.e., light signals) and generates an image using the optical signals. The imaging sensor may be used in digital cameras and imaging devices to convert light received (for example, on lenses) into a digital image. Optionally, the imaging sensor is selected from a group of: a Light Detection and Ranging (Lidar) sensor, a Radio Detection and Ranging (Radar), and/or a camera. In a first implementation, the imaging sensor may be the Lidar sensor. The Lidar, in operation, emits the Laser beams to measure a distance of an object or its portions from the Lidar. The distance is calculated by measuring a time taken by the Laser beams to return to the Lidar after reflection from the object or its portions. Examples of the Lidar sensor could be, but are not limited to, airborne Lidar, topographic Lidar, bathymetric Lidar, and terrestrial Lidar.

In a second implementation, the imaging sensor may be the Radar. The Radar utilizes radio waves to determine distance, angle, and radial velocity of the required object in the real-world environment from a point of reference. The Radar could be at least one of: a pulse radar, continuous wave radar. Examples of the pulse radar include, basic pulse radar, moving target indication radar, and the like. Examples of the continuous wave radar include, unmodulated continuous wave radar, frequency modulated continuous wave radar.

In a third implementation, the imaging sensor may be the camera. The camera could be a Red-Green-Blue (RGB) camera, a RGB depth camera, a grayscale camera, a black and white camera, or the like.

The term "pose" refers to a combination of a position and an orientation. The pose of the imaging sensor is determined with respect to a reference coordinate system of the real-world environment. The pose is a crucial factor for perceiving the real-world environment using the imaging sensor. The pose of the imaging sensor can be changed by changing the position and/or the orientation of the imaging sensor. Optionally, the imaging sensor is calibrated according to a required pose. The required pose of the imaging sensor gets changed or disturbed during operation of the imaging sensor over a period of time.

Optionally, the first image is captured by the imaging sensor at the first pose at a first instant. Optionally, the second image is captured by the imaging sensor at the second pose at a second instant. Optionally, the second image is captured after the first image. For example, the first image and the second image may be consecutive images. Optionally, the first image and the second image are captured at any arbitrary moments of time. Optionally, a time difference between the first instant and the second instant lies in a range of 1 millisecond (msec) to 1 year. For example, the time difference may lie in a range of 1 msec, 500 msec, 1 second, 10 minutes (min), 30 min, 60 min, 12 hours, 1 day, 15 days, 30 days, 90 days, 150 days, or 250 days up to 15 days, 75 days, 135 days, 185 days, 235 days, 275 days, 310 days, 340 days, or 365 days. In this regard, the first image and the second image can have one image, or a plurality of images captured between the first instant and the second instant. For example, the first image and the second image may be captured at a certain time difference such that there are multiple images captured between them. Notably, the first image and the second image pertain to the real-world environment. Optionally, the real-world environment is an indoor environment and/or an outdoor environment. As an example, the imaging sensor may be placed in the outdoor environment such as in ports at a required height.

The term "processor" refers to a computational element that is operable to respond to and process instructions. Furthermore, the term "processor" may refer to one or more individual processors, processing devices and various elements associated with a processing device that may be shared by other processing devices. Such processors, processing devices and elements may be arranged in various architectures for responding to and executing processing steps.

The at least one processor is communicably coupled to the imaging sensor via a communication network. It will be appreciated that the communication network may be wired, wireless, or a combination thereof. The communication network could be an individual network or a combination of multiple networks. Examples of the communication network may include, but are not limited to one or more of, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a short-range radio network (such as Bluetooth®).

The term "transformation" refers to rotation and/or translation of the imaging sensor over a period of time. The rotation and/or translation results in a change in the position and/or the orientation of the imaging sensor with respect to the reference coordinate system, over the period of time. The transformation in the position and/or the orientation of the imaging sensor could be produced by unwanted movement of the imaging sensor due to factors such as heavy wind, arrangement of the imaging sensor, and the like. For example, the imaging sensor may be mounted on a pole, therefore, the position and/or the orientation of the imaging sensor may be changed due to occasional heavy winds. In another example, the imaging sensor may be mounted on a moving car, and, therefore, the position and/or the orientation may be changed due to unwanted motion of the moving car.

Notably, the at least one processor determines the first transformation between the first pose and the second pose of the imaging sensor. Optionally, the at least one processor determines the first transformation by determining a change in a position of a fixed point in the second image captured in the second pose with respect to the first image captured in the first pose. Optionally, the first image is used as a reference image for determining the change in the position of the fixed point in the second image with respect to the first image.

Upon determining the first transformation, the at least one processor corrects the second image based on the first image. Notably, the second image is transformed to be perspective-consistent with the first image captured in the first pose. An image is understood to be "perspective-consistent" with respect to another image when said images represent a same or nearly same perspective of the real-world environment. Perspective-consistent images represent objects in the real-world environment from a similar viewpoint.

Optionally, when determining the first transformation, the imaging sensor is a Light Detection and Ranging (Lidar) sensor and the first image is a first point cloud and the second image is a second point cloud, at least one processor is configured to:

identify a first set of data points in the first point cloud and a second set of data points in the second point cloud;

determine local position vectors of the data points in the first set and the second set, in at least one local coordinate system of the Lidar sensor;

determine global position vectors of the data points in the first set and the second set in a global coordinate system associated with the real-world environment, based on the local position vectors, a rotation matrix, and a translation matrix;

construct a first plane using a global position vector of a data point in the first set and a plurality of first non-collinear unit vectors, and a second plane using a global position vector of a data point in the second set and a plurality of second non-collinear unit vectors;

determine a first normal vector of the first plane and a second normal vector of the second plane based on the plurality of first non-collinear unit vectors and the plurality of second non-collinear unit vectors, respectively; and calculate the first transformation based on a rotation axis and a rotation angle between the first normal vector and the second normal vector.

Optionally, the Lidar sensor performs rotational motion in for enabling in 360 degrees imaging of the real-world environment. Optionally, the Lidar sensor has a plurality of vertical scan lines and a plurality of measurement angles in one rotation. The measurement angles are fixed angles between two consecutive vertical scan lines while the Lidar sensor is rotating (or spinning). Optionally, the Lidar sensor has approximately sixteen vertical scan lines and hundreds of measurement angles in one rotation. As a first example, a set of three vertical scan lines, namely B1, B2, B3 of the Lidar sensor are considered in the present disclosure for ease of calculation. A given point cloud includes a set of data points representing the real-world environment in 3D space at a given time. Optionally, the Lidar sensor captures the first image comprising the first set of data points and the second image comprising the second set of data points. The first set of data points represent the real-world environment in 3D space at the first time and from a perspective of the first pose, whereas the second set of data points represent the real-world environment in 3D space at the second time and from a perspective of the second pose.

Further, the at least one processor optionally identifies the local position vectors of the data points in the first set and the data points in the second set. A local position vector of a data point in a given set of data points is defined as a vector that indicates either a position or a location of the data point with respect to an arbitrary reference point. Herein, the arbitrary reference point is an origin of the at least one local coordinate system of the Lidar sensor. Continuing the first example, amongst a plurality of data points in the first set and the second set, three data points from each set may be considered for determining the local position vectors. In the first example, the data points in the first set may be referred to as (1, 2, 3) and the data points in the second set may be referred to as (1', 2', 3').

Optionally, the local position vector of the data point is calculated by taking a dot product of a direction vector of the data point and a measured distance of the data point from the origin of the local coordinate system. The term "dot product" refers to a product of magnitudes of the direction vector, the measured distance, and a cosine of an angle between the two direction vectors. The "direction vector" refers to a vector of a point making a required angle with an x-axis of the local coordinate system. Continuing the first example, the local position vectors of the data points (1, 2, 3) in the first set may be referred to as (a1, a2, a3) and the local position vectors of the data points (1', 2', 3') in the second set may be referred to as (a1', a2', a3'). The local position vectors (a1, a2, a3) and (a1', a2', a3') are calculated as follows:

$$a_1 = n_1 d_1, a_2 = n_2 d_2, a_3 = n_3 d_3$$

$$a_1' = n_1 d_1, a_2' = n_2 d_2, a_3' = n_3 d_3$$

Herein, $a_i$ are the position vector, $n_i$ are the direction vector and $d_i$ is measured distance of data points (1, 2, 3) in the first set and the data points (1', 2', 3') in the second set from the origin of the local coordinate system, wherein i=1, 2, 3.

Further, the at least one processor optionally determines the global position vectors of the data points in the first set and the second set in the global coordinate system. The global position vectors of the data points are determined to ensure that positions of the data points are measured with respect to a fixed origin, which is the origin of the global coordinate system. In other words, since the origin of the global coordinate system does not change with movement of the Lidar sensor, it serves as an accurate point of reference for position determination. The "rotation matrix" refers to a transformation matrix which operates on a local position vector of a data point to give a rotated global position vector of the data point at a given time. The "translation matrix" refers to a matrix which operates on the local position vector of the data point to give a translated global position vector of the data point at the given time.

It will be appreciated that in order to transform the data points from the local coordinate system to the global coordinate system, a rotational as well as translational component must be taken into consideration. Continuing the first example, the global position vectors of the data points (1, 2, 3) in the first set may be referred to as ($p_1$, $p_2$, $p_3$) and the global position vectors of the data points (1', 2', 3') in the second set may be referred to as ($q_1$, $q_2$, $q_3$). The global position vectors for the data points (1, 2, 3) and (1', 2', 3') may be calculated as follows:

$$p_1 = Ra_1 + T, \ p_2 = Ra_2 + T, \ p_3 = Ra_3 + T$$

$$q_1 = Ra_1' + T, \ q_2 = Ra_2' + T, \ q_3 = Ra_3' + T$$

Herein, R is the rotation matrix, {a1, a2, a3} and {a1', a2', a3'} are the position vectors for each data point in the local coordinate system and T is the translation matrix.

A reference state of the Lidar sensor refers to a state where the rotation matrix is an identity matrix, wherein the identity matrix represents a condition when there is no rotation and the translation matrix is {0,0, H}. Herein, it is assumed that the Lidar sensor is mounted high in the real-world environment, wherein "H" is a height of the Lidar sensor from a ground surface in the real-world environment.

Further, the at least one processor optionally constructs the first plane and the second plane of the given data point in the first set and the second set. Continuing the first example, the first plane may be constructed using the global position vector {$P_1$, $P_2$, $P_3$} of the data points (1, 2, 3) and the plurality of first non-collinear unit vectors, whereas the second plane may be constructed using the global position vectors {$q_1$, $q_2$, $q_3$} and the plurality of the second non-collinear unit vectors. A given plane is defined by a set of points lying in a two-dimensional space. Continuing the first example, the plurality of the first non-collinear unit vectors may be referred to as ($u_1$, $u_2$) and the plurality of second non-collinear unit vectors may be referred to as ($u_1'$, $u_2'$). Optionally, the plurality of the first non-collinear unit vector and the second non-collinear unit vectors lie in the same plane. Optionally, the plurality of the first non-collinear unit vector and the second non-collinear unit vectors are not parallel to each other. The plurality of the first non-collinear unit vectors may, for example, be calculated as follows:

$$u_1 = \frac{a_2 - a}{\|a_2 - a_1\|}, u_2 = \frac{a_5 - a_4}{\|a_5 - a_4\|}$$

The plurality of the second non-collinear unit vectors ($u_1'$, $u_2'$) and the global position vector {$q_1$}, are used to construct the second plane. The plurality of second non-collinear unit vectors may, for example, be calculated as follows:

$$u_1' = \frac{a_2' - a_1'}{\|a_2' - a_1'\|}, u_2' = \frac{a_5' - a_4'}{\|a_5' - a_4'\|}$$

Further, the at least one processor optionally determines the first normal vector of the first plane and the second normal vector of the second plane. Continuing the first example, the first normal vector may be referred to as $h_1$ and the second normal vector may be referred to as $h_2$. The "normal vector" refers to a vector which is perpendicular to a given plane at a given point. The given normal vector of the given plane is obtained by taking a cross product of at least two-unit vectors. Continuing the first example, the first normal vector $h_1$ and the second normal vector $h_2$ may be calculated as follows:

$$h_1 = u_1 \times u_2, h_2 = u_1' \times u_2'$$

Next, the at least one processor optionally calculates the first transformation based on the rotation axis and the rotation angle between the first normal vector and the second normal vector. Optionally, the rotation axis of the second normal vector with respect to the first normal vector is calculated by taking a cross product of the first normal vector $h_1$ and the second normal vector $h_2$. Continuing the first example, the rotation axis may be calculated as follows:

$$r_2 = h_1 \times h_2$$

Furthermore, the rotation angle of the second normal vector $h_2$ with respect to the first normal vector $h_1$ indicates movement of the Lidar sensor at the second time with respect to the first time. The rotation angle corresponding to the rotation axis $r_2$ is referred to as {$\theta_2$}. The $\theta_2$ may, for example, be calculated as follows:

$$\theta_2 = \cos^{-1}(h_1 \cdot h_2)$$

Herein, $\theta_2$ is the rotation angle, $h_1$ is the first normal vector and $h_2$ is the second normal vector. Advantageously, the technical effect of determining the first transformation is that the images captured by the imaging sensor can be accurately corrected based on the first transformation enhancing accuracy and usability of the imaging sensor.

Optionally, when identifying the first set of data points in the first point cloud and the second set of data points in the second point cloud, the at least one processor is configured to:

determine whether a distance between at least two first data points in the first point cloud and at least two second data points in the second point cloud is less than a first threshold value; and when the distance between the at least two first data points in the first point cloud and the at least two second data points in the second point cloud is less than the first threshold value, select the at least two first data points to belong to the first set of data points and the at least two second data points to belong to the second set of data points.

In this regard, the at least one processor determines a distance between the at least two data points in the first point cloud and the second point cloud. The at least one processor selects the data points in the first set and the data points in the second set of data points depending upon the distance between the at least two data points in the first point cloud and the second point cloud. As a second example, the plurality of first data points in the first point cloud may be $\{p_1, p_2, p_3, p_4, p_5, p_6, p_7, p_8, p_9\}$ and the plurality of second data points in the second point cloud may be $\{q_1, q_2, q_3, q_4, g_5, q_6, q_7, q_8, q_9\}$. The distance between two respective data points of the first point cloud is calculated as a difference in a magnitude of the at least two first data points. Optionally, the first threshold value lies in a range of 0.05-0.5 meters. Notably, in case, the difference is less than the first threshold value, the at least one processor selects the first data point to belong to the first set of data points and the second data points to belong to the second set of data points.

Continuing the second example, at time $t_0$, a first set of differences $\{d_1, d_2, d_3\}$ in magnitude of the data points $\{p_1, p_2, p_3\}$ with the magnitude of the data points $\{p_4, p_5, p_6\}$ and a second set of differences $\{d_4, d_5, d_6\}$ in the magnitude of data points $\{p_4, p_5, p_6\}$ with the magnitude of the data points $\{p_7, p_8, p_9\}$ is calculated as follows:

$$\|p_4 - p_1\| = d_1 < K_1$$

$$\|p_5 - p_2\| = d_2 < K_1$$

$$\|p_6 - p_3\| = d_3 < K_1$$

$$\|p_7 - p_4\| = d_4 > K_1$$

$$\|p_8 - p_5\| = d_5 > K_1$$

$$\|p_9 - p_6\| = d_6 > K_1$$

Continuing the second example, the first threshold value may be referred to as $K_1$. The first set of difference $\{d_1, d_2, d_3\}$ is less than the first threshold value $K_1$, the at least one processor may select the data points $\{p_1, p_2, p_3\}$ to belong to the first set and the data points $\{p_4, p_5, p_6\}$ to belong to the second set. When the second set of difference $\{d_4, d_5, d_6\}$ is greater than or equal to the first threshold value $K_1$, the processor may not select the data points $\{p_7, p_8, p_9\}$ to the first set of data points. Similarly, a second set of difference is calculated for the at least two second data points in the second point cloud. Optionally, the second set of difference is calculated as the difference in the magnitude of the at least two second set of data points. Advantageously, the technical effect of this is that the distance between at least two data points in the first point cloud and the second point validates the data points before being used for calculating the first transformation resulting in accurate calculation of the first transformation.

Optionally, the at least one processor is further configured to determine whether a rotation angle of a given non-collinear unit vector is less than a second threshold value. In this regard, the given non-collinear unit vector is at least one of: a non-collinear unit vector from amongst the plurality of first non-collinear unit vectors, a non-collinear unit vector from amongst the plurality of second non-collinear unit vectors. Referring to the first example, let us consider the first set of data points (1, 2, 3) in the global coordinate system. The rotation angle of the non-collinear unit vector $u_1$ is calculated as follows:

$$r_1 \cos^{-1}(u_1 \cdot \{0, 0, 1\})$$

Following calculation of the rotation angle (in degree units), the at least one processor determines whether the rotation angle $\{r_1\}$ of the non-collinear unit vector $\{u_1\}$ is less than the second threshold value. Optionally, the second threshold value lies in a range of 10-80 degrees. Optionally, when the rotation angle $\{r\}$ of the non-collinear unit vector $\{u_1\}$ is less than the second threshold value, the at least one processor selects the non-collinear unit vector $\{u_1\}$ for determining the first normal vector of the first plane and the second normal vector of the second plane. The rotation angle of the given non-collinear unit vector is determined to accurately determine the rotation angle of the given normal vector resulting in determination of the first transformation.

Optionally, when determining the first transformation, the at least one processor is further configured to:

identify a first ground plane and a first vertical plane in the first point cloud;

identify a second ground plane and a second vertical plane in the second point cloud;

obtain beam aiming angle information corresponding to the first time and the second time, from the Lidar sensor; and determine an angular movement of the Lidar sensor in a time interval between the first time and the second time, based on the first ground plane, the first vertical plane, the second ground plane, the second vertical plane, and the beam aiming angle information corresponding to the first time and the second time, wherein the angular movement pertains to the first transformation.

Optionally, in this regard, a given ground plane and a given vertical plane are identified in a given point cloud using at least one plane detection algorithm. The plane detection algorithm may be a Random sample consensus (RANSAC) algorithm, Hough transform algorithm, and the like.

Optionally, the first ground plane and the first vertical plane belong to an object as represented in the first point cloud, and the second ground plane and the second vertical plane belong to said object as represented in the second point cloud.

The term "beam aiming angle information" refers to an information of an angle of inclination of a beam emitted from the Lidar sensor with respect to the first ground plane and the first vertical plane at the first time, and with respect to the second ground plane and the second vertical plane at the second time. Optionally, the beam aiming angle information lies in a range of 0 degrees to 360 degrees. For example, the beam aiming information may lie in a range of 0 degrees, 30 degrees, 60 degrees, 100 degrees, 150 degrees, or 200 degrees up to, 20 degrees, 80 degrees, 140 degrees, 200 degrees, 250 degrees, 300 degrees, 330 degrees or 360 degrees. As an example, a beam emitted from the Lidar sensor may have the beam aiming angle information of 30 degrees with respect to a given ground plane and 60 degrees with respect to a given vertical plane.

Optionally, a change in the beam aiming angle information of the lidar sensor with respect to the given ground plane and/or the given vertical plane signifies the angular movement of the Lidar sensor. Optionally, a change in the beam aiming angle information of Lidar sensor during a time interval between the second time and the first time pertains to the first transformation of the Lidar sensor. In other words, the change in the beam aiming angle information of Lidar sensor during a time interval between the second time and the first time is indicative of the angular movement of the Lidar sensor during said time interval. The angular movement of the Lidar sensor could occur in a ground direction and/or in a vertical direction. Magnitudes and directions of beam angles indicated in the beam aiming angle information are indicative of a magnitude and a direction of the angular movement of the Lidar sensor. Optionally, the first transformation indicates the angular movement (or change) in a position of the Lidar sensor at the second time with respect to the position of the Lidar sensor at the first time. For example, the beam aiming angle information of the Lidar sensor at the first vertical plane, at the first instant may be 60 degrees and the second vertical plane at the second instant may be 40 degrees, therefore, the angular movement of the Lidar sensor in the vertical direction may be 60 degrees minus 40 degrees. Similarly, the beam aiming angle information of the Lidar sensor at the first ground plane at the first instant may be 30 degrees and at the second ground plane at the second instant may be 0 degree, therefore, the angular movement of the Lidar sensor in the ground direction may be 30 degrees minus 0 degrees. Advantageously, the angular movement of the Lidar sensor can be accurately calculated in the above manner, thereby resulting in significant correction (i.e., digital stabilization) of images captured by the Lidar sensor.

Optionally, when determining the first transformation, the imaging sensor is a camera and the first image is a first camera image and the second image is a second camera image, the at least one processor is configured to:

identify a first set of features in the first camera image and a second set of features in the second camera image;

match the features of the first set with the features of the second set to identify a third set of features that correspond to at least one static object;

identify a change in poses of the features of the third set in a time interval between the first time and the second time; and calculate the first transformation based on the change in the poses of the features of the third set.

In this regard, the first set of features and the second set of features in the first camera image and the second camera image, respectively, could be one or more of edges, corners, blobs, and the like. Optionally, the camera captures the first camera image of the real-world environment at the first time and the second camera image of the real-world environment at the second time. Optionally, the at least one processor is configured to determine the first set of features and the second of features using at least one feature detection algorithm. Optionally, the at least one feature detection algorithm is at least one of: an edge-detection algorithm, corner-detection algorithm, a blob-detection algorithm, a feature descriptor algorithm.

Further, the at least one processor is optionally configured to identify the third set of features which are common to the features of the first set in the first camera image and the features of the second set in the second camera image. This means that the third set of features includes one or more features of the first set that match with one or more corresponding features of the second set. Notably, the third set of features corresponds to the features of the at least one static object. The term "static object" refers to an object which is fixed for a required time duration. For example, the static object may be a building, a stationary vehicle, a tree, or the like.

Optionally, the at least one processor identifies the change in the poses of the features of the third set, using the at least one feature detection algorithm. Herein, a pose of a given feature of the third set corresponds to a position and/or an orientation of the given feature corresponding to the at least one static object. For example, we may consider the building as a static object. The change in the pose of the building may be determined by identifying the change in the position and/or orientation of edges of the building as captured in the first camera image and the second camera image.

Next, the at least one processor calculates the first transformation between the first image and the second image by calculating the change in the poses of the features of the third set. The change in the poses of the features of the third set is calculated using at least one image processing algorithm. Optionally, a given image processing algorithm is an object identification algorithm, a feature detection algorithm, a photogrammetry algorithm, and the like. Optionally, the change in the poses of the features of the third set pertains to the first transformation of the camera. Optionally, the first transformation represents a change in the rotation axis and the rotation angle of the camera at the second time with respect to the first time. Advantageously, the technical effect of determining the first transformation is that the images captured by the camera can be accurately corrected (i.e., digitally stabilized) based on the first transformation, eventually enhancing accuracy and usability of the camera.

Optionally, the system further comprises at least one movement sensor configured to sense at least one movement value of the imaging sensor, wherein the at least one processor is further configured to:

receive the at least one movement value from the at least one movement sensor; and generate at least one mathematical model that emulates movement of the imaging sensor, wherein parameters of the at least one mathematical model are determined using the at least one movement value, and wherein the first transformation is determined based on the at least one mathematical model.

In this regard, the at least one movement sensor is communicably coupled to the at least one processor. Examples of the at least one movement sensor include, but are not limited to, an inertial measurement unit (IMU), an accelerometer, a gyroscope, a magnetometer, and a Passive infrared (PIR) sensor. The at least one processor receives the at least one movement value of the at least one imaging sensor via the communication network. The at least one movement value of the imaging sensor includes at least one of: a rotation value, a tilt value, a displacement value, and the like.

Optionally, the movement of the imaging sensor is a simple harmonic oscillation. Optionally, in this regard, the at least one mathematical model is a simple harmonic oscillator model. Parameters of the at least one mathematical model are obtained by the at least one movement value provided by the at least one movement sensor. The at least one mathematical model is used to obtain the first transformation.

For example, to generate at least one mathematical model in one dimension, the task may be to solve equations as follows:

$$m \cdot d^2 x(t)/dt + k \cdot x(t) = 0,$$

where boundary conditions are as follows:

$$x(0) = A$$

$$x'(t) = B$$

The result in this case is as follows:

$$x(t) = B \cdot \sin(o \cdot t)/o + A \cdot \cos(o \cdot t),$$

where o is the harmonic frequency. The task is to find the A, B and o from the measured data and predict the motion of the sensor by these.

Advantageously, the technical effect of generating the at least one mathematical model is that the first transformation can be accurately determined resulting in significant accuracy enhancement in correction of the given image captured at the given time.

Optionally, when determining the first transformation, the at least one processor is further configured to generate at least one machine learning (ML) model by training a neural network using at least one ML algorithm, wherein the at least one ML model is indicative of the first transformation. In this regard, the at least one processor generates the at least one ML algorithm by training the neural network using the first set of data points in the first point cloud and the second set of data points in the second point cloud. Examples of the neural network could be, but are not limited to, an artificial neural network (ANN), an inverting neural network (INN), a convolutional neural network (CNN), a recurrent neural network (RNN). Optionally, upon feeding the data points to the neural network, the at least one ML algorithm is applied to the neural network to infer a learning function from the data points, thereby generating the at least one ML model. Optionally, the at least one ML model predicts the first transformation of the imaging sensor between the first pose and the second pose. Advantageously, the technical effect of generating the at least one ML model is that the first transformation is accurately predicted resulting in significant enhancement in accuracy of the digital correction of the given image captured at the given time. When using ANN approach, for example, a model having 1 input layer, 5 hidden layers and 1 output layer can estimate the parameters for the next time instant of the movement correction. Also, autoregressive integrated moving average estimators can be used.

Optionally, the first transformation is determined using poses of a first imaging sensor of a first type and the first transformation is used to correct an image captured with a second imaging sensor of a second type, wherein both the first type and the second type of imaging sensors are coupled to a common mounting platform to prevent at least some of relative motion between the first type and the second type of imaging sensors. In this regard, the poses of the first imaging sensor correspond to the position and/or the orientation of the first imaging sensor at the given time. Optionally, a given imaging sensor is one of: a camera, a Lidar sensor, a Radar sensor. Optionally, the first imaging sensor of the first type and the second imaging sensor of the second type are similar.

Alternatively, optionally, the first type and the second type of the imaging sensors are different. For example, the first imaging sensor may be the Lidar sensor and the second imaging sensor may be the camera. Optionally, the first transformation of the first imaging sensor is calculated by determining change in poses of the first imaging sensor. Optionally, either of the image captured by the first imaging sensor or the second imaging sensor is used as a reference image to correct a given image of the first imaging sensor of the first type and the second imaging sensor of the second type.

The relative motion between the first type and the second type of the imaging sensors may result in disruption of signals produced by the first imaging sensor and the second imaging sensor with respect to each other. To align the signals produced by the first imaging sensor and the second imaging sensor with respect to each other and with respect to a reference (i.e., the real-world environment), the first and second imaging sensors are mounted to the common mounting platform. Optionally, the first imaging sensor and the second imaging sensor are mounted to the common mounting platform using at least one of: a fastener, an anchor. The common mounting platform could have a predefined shape and predefined dimensions. The predefined shape could be, but is not limited to, a square shape, a rectangular shape, a circular shape, and the like. The predefined dimensions are such that the first imaging sensor and the second imaging sensor can be positioned on the common mounting platform with ease. Advantageously, the technical effect of this is that the images captured using the first imaging sensor and the second imaging sensor are corrected accurately with respect to each other.

Optionally, the imaging sensor is arranged at a predefined height on an object having a height, e.g., in the range of 0.5-50 meters. The object is arranged in the real-world environment. The object could be at least one of: a movable object, a fixed object. Examples of the movable object could be, but are not limited to, a movable vehicle, a movable robot, and the like. Examples of the fixed object could be, but are not limited to, a building, a pole, and the like. Optionally, the imaging sensor is placed at the predefined height of 0.5-50 meters on the object. Optionally, the imaging sensor is placed at the predefined height lying in a range of 0.5-50 meters from the top of the object.

The present disclosure also relates to the method for stabilizing imaging sensor data as described above. Various embodiments and variants disclosed above, with respect to the aforementioned first aspect, apply mutatis mutandis to the method.

Optionally, when determining the first transformation, the imaging sensor is a Light Detection and Ranging (Lidar) sensor and the first image is a first point cloud and the second image is a second point cloud, the method comprises:

identifying a first set of data points in the first point cloud and a second set of data points in the second point cloud;

determining local position vectors of the data points in the first set and the second set, in at least one local coordinate system of the LiDAR sensor;

determining global position vectors of the data points in the first set and the second set in a global coordinate system associated with the real-world environment, based on the local position vectors, a rotation matrix, and a translation matrix;

constructing a first plane using a global position vector of a data point in the first set and a plurality of first non-collinear unit vectors, and a second plane using a global position vector of a data point in the second set and a plurality of second non-collinear unit vectors;

determining a first normal vector of the first plane and a second normal vector of the second plane based on the plurality of first non-collinear unit vectors and the plurality of second non-collinear unit vectors, respectively; and calculating the first transformation based on a rotation axis and a rotation angle between the first normal vector and the second normal vector.

Optionally, when identifying the first set of data points in the first point cloud and the second set of data points in the second point cloud, the method comprises:

determining whether a distance between at least two data points in the first point cloud and the second point cloud is less than a first threshold value; and when the distance between the at least two data points in the first point cloud and the second point cloud is less than the first threshold value, selecting the at least two data points to belong to the first set of data points and the second set of data points.

Optionally, when determining the first transformation, the imaging sensor is a camera and the first image is a first camera image and the second image is a second camera image, the method comprises:

identifying a first set of features in the first camera image and a second set of features in the second camera image;

matching the features of the first set with the features of the second set for identifying a third set of features that correspond to at least one static object;

identifying a change in poses of the features of the third set in a time interval between the first time and the second time; and calculating the first transformation based on the change in the poses of the features of the third set.

The present disclosure also relates to the computer program product for stabilizing imaging sensor data as described above. Various embodiments and variants disclosed above, with respect to the aforementioned first aspect and the second aspect, apply mutatis mutandis to the computer program product.

The term "computer program product" refers to a software product comprising program instructions that are recorded on the non-transitory machine-readable data storage medium, wherein the software product is executable upon a computing hardware for implementing the aforementioned steps of the method for stabilizing imaging sensor data.

In an embodiment, the non-transitory machine-readable data storage medium can direct a machine (such as the at least one processor, a computer, other programmable data processing apparatus, or other devices) to function in a particular manner, such that the program instructions stored in the non-transitory machine-readable data storage medium cause a series of steps to implement the function specified in a flowchart corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

DETAILED DESCRIPTION

Figure 1A:
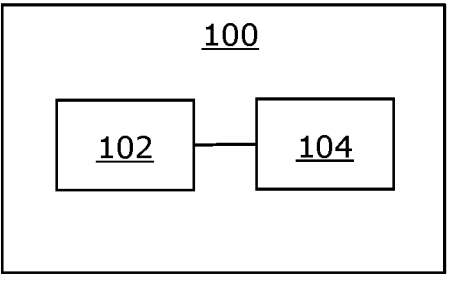
FIGS. 1A and 1B are block diagrams of architectures of a system for stabilizing imaging sensor data, in accordance with an embodiment of the present disclosure.
Figure 1B:
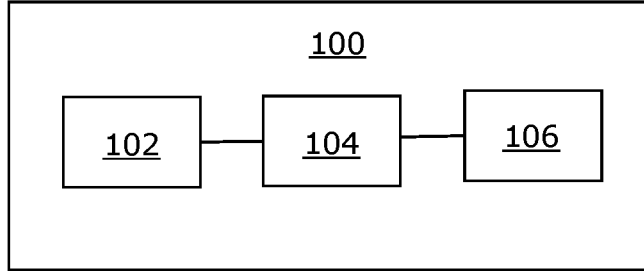

Referring to FIGS. 1A and 1B, illustrated are block diagrams of architectures of a system 100 for stabilizing imaging sensor data, in accordance with an embodiment of the present disclosure. The system 100 comprises an imaging sensor 102 and at least one processor (depicted as a processor 104) communicably coupled to the imaging sensor 102.

In FIG. 1B, the system 100 further comprises at least one movement sensor (depicted as a movement sensor 106) configured to sense at least one movement value of the imaging sensor 102.

FIGS. 1A and 1B are merely examples, which should not unduly limit the scope of the claims herein. A person skilled in the art will recognize many variations, alternatives, and modifications of embodiments of the present disclosure.

Referring to FIG. 2, illustrated is a flow chart of steps of method for stabilizing imaging sensor data, in accordance with an embodiment of the present disclosure. At step 202, a first image is captured using an imaging sensor arranged in a first pose in respect to a real-world environment. At step 204, a second image is captured using the imaging sensor arranged in a second pose in respect to the real-world environment. At step 206, a first transformation is determined between the first pose and the second pose. At step 208, the second image is corrected, based on the first image and the first transformation, to be perspective-consistent with the first pose.

The aforementioned steps are only illustrative and other alternatives can also be provided where one or more steps are added, one or more steps are removed, or one or more steps are provided in a different sequence without departing from the scope of the claims herein.

Figure 3A:
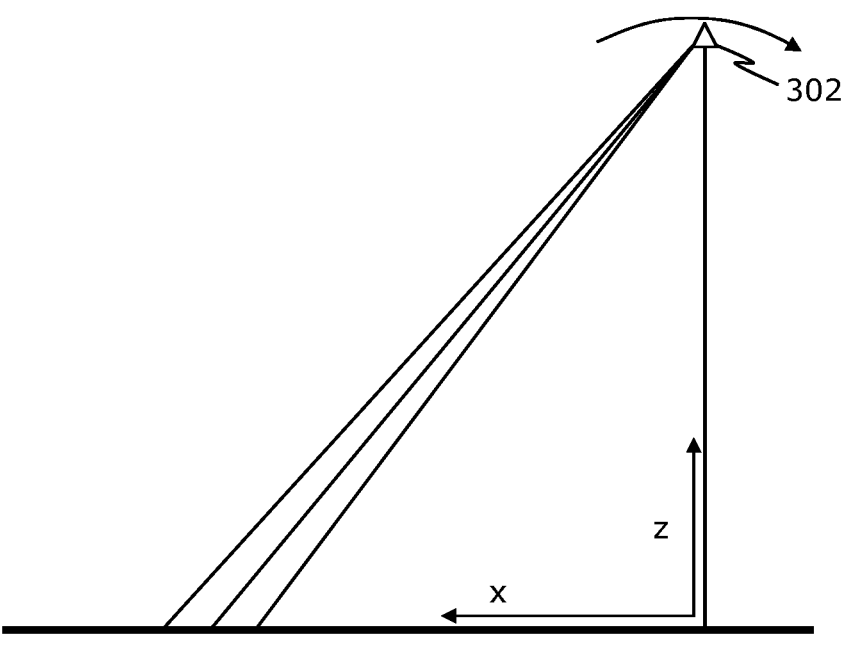
FIGS. 3A, 3B, 3C and 3D are exemplary illustrations of beams emitted from a Lidar sensor at an object in a real-
Figure 3B:
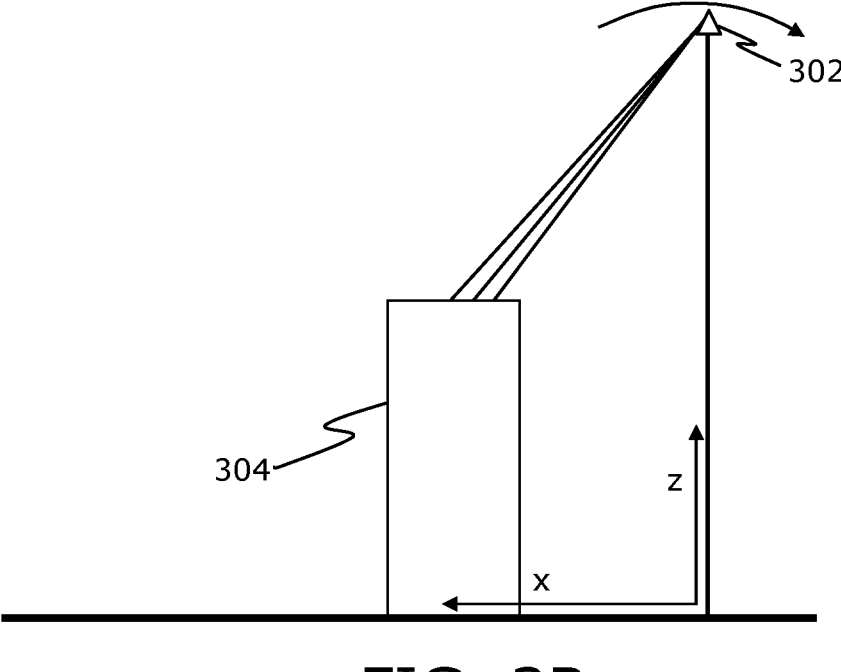
Figure 3C:
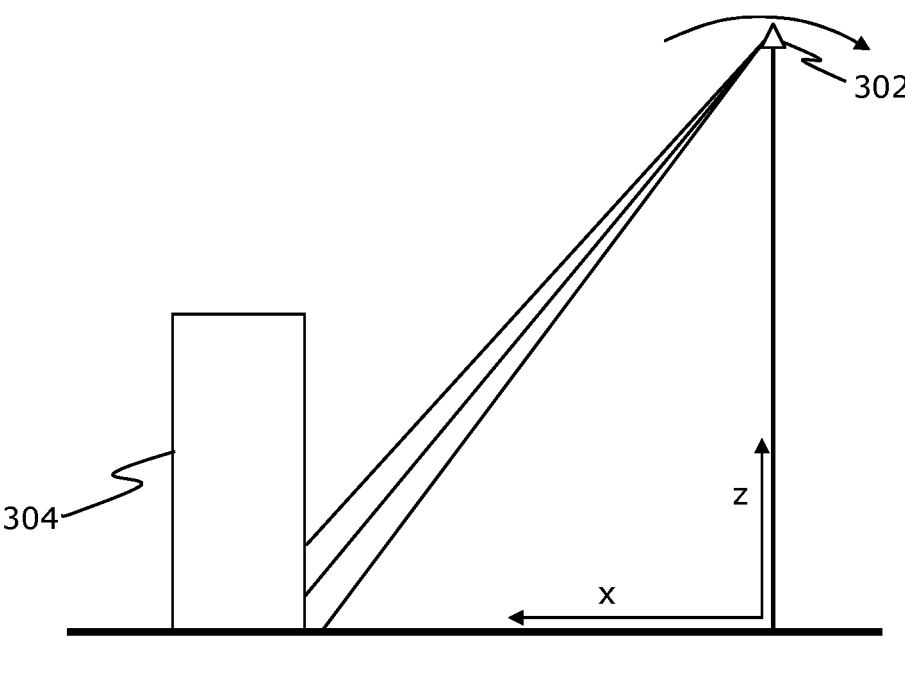
Figure 3D:
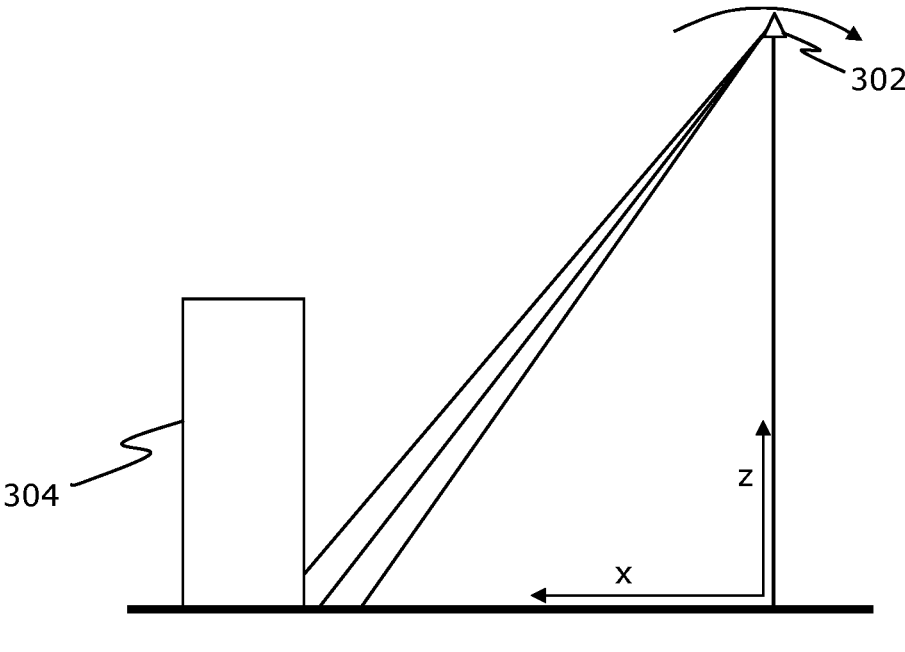

Referring to FIGS. 3A, 3B, 3C and 3D, illustrated are exemplary illustrations of beams emitted from a Lidar sensor (depicted as a Lidar sensor 302) at an object (depicted as an object 304) in a real-world environment at different instances, in accordance with an embodiment of the present invention. The Lidar sensor 302 is mounted at a required height from a ground surface (thick black horizontal line in FIGS. 3A-3D), for example at the top of a pole. The height may be, for example, about 10 meters. In FIG. 3A, beams hit on the ground surface. In FIG. 3B, beams hit on top of the object 304. In FIG. 3C, beams hit side of the object 304. In FIG. 3D, beams hit the ground surface and the side of the object 304. Beams emitted from the Lidar sensor 302 identifies distance of the object 304 from the Lidar sensor 302 at different instances.

FIGS. 3A, 3B, 3C and 3D are merely examples, which should not unduly limit the scope of the claims herein. A person skilled in the art will recognize many variations, alternatives, and modifications of embodiments of the present disclosure.

Referring to FIGS. 4A and 4B, illustrated are exemplary illustrations of a first set of data points in a first point cloud and a second set of data points in a second point cloud, respectively, in accordance with an embodiment of the present invention. In FIG. 4A, a top-down view of the first set of data points (depicted for example as p1, p2, p3 p4, p5, p6, p7, p8 and p9) in the first point cloud at a first instant are shown. A Lidar sensor (not shown) transforms from its first pose at the first instant to a second pose at a second instant. In FIG. 4B, the top-down view of the second set of data points (depicted for example as q1, q2, q3, q4, q5, q6, q7, q8 and q9) in the second point cloud at the second instant are shown. The second set of data points (q1, q2, q3, q4, q5, q6, q7, q8 and q9) are shown to be moved at the second instant as compared to the first instant.

FIGS. 4A and 4B are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for stabilizing imaging sensor data, the system comprising:

an imaging sensor configured to capture
a first image in a first pose of the imaging sensor in respect to a real-world environment, and
a second image in a second pose of the imaging sensor in respect to the real-world environment;
at least one processor communicably coupled to the imaging sensor, wherein the at least one processor is configured to:
determine a first transformation between the first pose and the second pose; and
correct the second image, based on the first image and the first transformation, to be perspective-consistent with the first pose;
wherein when determining the first transformation, the imaging sensor is a Light Detection and Ranging (Lidar) sensor and the first image is a first point cloud and the second image is a second point cloud, at least one processor is configured to:
identify a first set of data points in the first point cloud and a second set of data points in the second point cloud;
determine local position vectors of the data points in the first set and the second set, in at least one local coordinate system of the Lidar sensor;
determine global position vectors of the data points in the first set and the second set in a global coordinate system associated with the real-world environment, based on the local position vectors, a rotation matrix, and a translation matrix;

construct a first plane using a global position vector of a data point in the first set and a plurality of first non-collinear unit vectors, and a second plane using a global position vector of a data point in the second set and a plurality of second non-collinear unit vectors;
determine a first normal vector of the first plane and a second normal vector of the second plane based on the plurality of first non-collinear unit vectors and the plurality of second non-collinear unit vectors, respectively; and
calculate the first transformation based on a rotation axis and a rotation angle between the first normal vector and the second normal vector;
wherein when determining the first transformation, the at least one processor is further configured to:
identify a first ground plane and a first vertical plane in the first point cloud;
identify a second ground plane and a second vertical plane in the second point cloud;
obtain beam aiming angle information corresponding to the first time and the second time, from the Lidar sensor; and
determine an angular movement of the Lidar sensor in a time interval between the first time and the second time, based on the first ground plane, the first vertical plane, the second ground plane, the second vertical plane, and the beam aiming angle information corresponding to the first time and the second time, wherein the angular movement pertains to the first transformation.

2. The system according to claim 1, wherein the imaging sensor is selected from a group of: a Light Detection and Ranging (Lidar) sensor, a Radio Detection and Ranging (Radar), and/or a camera.

3. The system according to claim 1, wherein when identifying the first set of data points in the first point cloud and the second set of data points in the second point cloud, the at least one processor is configured to:
determine whether a distance between at least two first data points in the first point cloud and at least two second data points in the second point cloud is less than a first threshold value; and
when the distance between the at least two first data points in the first point cloud and the at least two second data points in the second point cloud is less than the first threshold value, select the at least two first data points to belong to the first set of data points and the at least two second data points to belong to the second set of data points.

4. The system according to claim 1, wherein the at least one processor is further configured to determine whether a rotation angle of a given non-collinear unit vector is less than a second threshold value.

5. The system according to claim 1, wherein when determining the first transformation, the imaging sensor is a camera and the first image is a first camera image and the second image is a second camera image, the at least one processor is configured to:
identify a first set of features in the first camera image and a second set of features in the second camera image;
match the features of the first set with the features of the second set to identify a third set of features that correspond to at least one static object;
identify a change in poses of the features of the third set in a time interval between the first time and the second time; and

calculate the first transformation based on the change in the poses of the features of the third set.

6. The system according to claim 1, further comprising at least one movement sensor configured to sense at least one movement value of the imaging sensor, wherein the at least one processor is further configured to:

receive the at least one movement value from the at least one movement sensor; and generate at least one mathematical model that emulates movement of the imaging sensor, wherein parameters of the at least one mathematical model are determined using the at least one movement value, and wherein the first transformation is determined based on the at least one mathematical model.

7. The system according to claim 1, wherein when determining the first transformation, the at least one processor is further configured to generate at least one machine learning (ML) model by training a neural network using at least one ML algorithm, wherein the at least one ML model is indicative of the first transformation.

8. The system according to claim 1, wherein the first transformation is determined using poses of a first imaging sensor of a first type and the first transformation is used to correct an image captured with a second imaging sensor of a second type, wherein both the first type and the second type of imaging sensors are coupled to a common mounting platform to prevent at least some of relative motion between the first type and the second type of imaging sensors.

9. The system according to claim 1, wherein the imaging sensor is arranged at a predefined height on an object having a height in the range of 0.5-50 meters.

10. A method for stabilizing imaging sensor data, the method comprising:

capturing a first image using an imaging sensor arranged in a first pose in respect to a real-world environment;

capturing a second image using the imaging sensor arranged in a second pose in respect to the real-world environment;

determining a first transformation between the first pose and the second pose; and correcting the second image, based on the first image and the first transformation, to be perspective-consistent with the first pose;

wherein when determining the first transformation, the imaging sensor is a Light Detection and Ranging (Lidar) sensor and the first image is a first point cloud and the second image is a second point cloud, the method further comprising:

identifying a first set of data points in the first point cloud and a second set of data points in the second point cloud;

determining local position vectors of the data points in the first set and the second set in at least one local coordinate system of the Lidar sensor;

determining global position vectors of the data points in the first set and the second set in a global coordinate system associated with the real-world environment, based on the local position vectors, a rotation matrix, and a translation matrix;

constructing a first plane using a global position vector of a data point in the first set and a plurality of first non-collinear unit vectors, and a second plane using a global position vector of a data point in the second set and a plurality of second non-collinear unit vectors;

determining a first normal vector of the first plane and a second normal vector of the second plane based on the plurality of first non-collinear unit vectors and the plurality of second non-collinear unit vectors, respectively; and calculating the first transformation based on a rotation axis and a rotation angle between the first normal vector and the second normal vector;

wherein determining the first transformation includes:

identifying a first ground plane and a first vertical plane in the first point cloud;

identifying a second ground plane and a second vertical plane in the second point cloud;

obtaining beam aiming angle information corresponding to the first time and the second time, from the Lidar sensor; and determining an angular movement of the Lidar sensor in a time interval between the first time and the second time, based on the first ground plane, the first vertical plane, the second ground plane, the second vertical plane, and the beam aiming angle information corresponding to the first time and the second time, wherein the angular movement pertains to the first transformation.

11. The method according to claim 10, wherein when identifying the first set of data points in the first point cloud and the second set of data points in the second point cloud, the method comprising:

determining whether a distance between at least two data points in the first point cloud and the second point cloud is less than a first threshold value; and when the distance between the at least two data points in the first point cloud and the second point cloud is less than the first threshold value, selecting the at least two data points to belong to the first set of data points and the second set of data points.

12. The method according to claim 10, wherein when determining the first transformation, the imaging sensor is a camera and the first image is a first camera image and the second image is a second camera image, the method comprising:

identifying a first set of features in the first camera image and a second set of features in the second camera image;

matching the features of the first set with the features of the second set for identifying a third set of matching features that correspond to at least one static object;

identifying a change in poses of the features of the third set in a time interval between the first time and the second time; and calculating the first transformation based on the change in the poses of the features of the third set.

13. A computer program product for stabilizing imaging sensor data, the computer program product comprising a non-transitory machine-readable data storage medium having stored thereon program instructions that, when accessed by at least one processor, cause the at least one processor to implement the method of claim 10.

* * * * *